United States Patent [19]

Taniguchi et al.

[11] Patent Number: 5,097,284

[45] Date of Patent: Mar. 17, 1992

[54] CAMERA

[75] Inventors: Hidenori Taniguchi; Kazuo Ikawa, both of Kanagawa, Japan

[73] Assignee: Canon Kabushiki Kaisha, Tokyo, Japan

[21] Appl. No.: 604,113

[22] Filed: Oct. 26, 1990

[30] Foreign Application Priority Data

Nov. 2, 1989 [JP] Japan .................................. 1-286125

[51] Int. Cl.$^5$ ............................................ G03B 15/03
[52] U.S. Cl. ............................................ 354/415; 354/266
[58] Field of Search ................ 354/415, 137, 413, 266

[56] References Cited

U.S. PATENT DOCUMENTS

| | | | |
|---|---|---|---|
| 3,783,338 | 1/1974 | Bowen | 354/145.1 |
| 4,285,588 | 8/1981 | Mir | 354/137 |
| 4,299,464 | 11/1981 | Cushman | 354/137 |
| 4,978,989 | 12/1990 | Nakano et al. | 354/413 |
| 4,999,663 | 3/1991 | Nakamura | 354/415 |

Primary Examiner—W. B. Perkey
Attorney, Agent, or Firm—Robin, Blecker, Daley & Driscoll

[57] ABSTRACT

A camera comprises a first responsive circuit for initiating a red-eye phenomenon preventing illumination in response to a first stroke of operation on a shutter release button; a determining circuit for making a determination whether or not the red-eye phenomenon preventing illumination initiated by the first responsive circuit has lasted for a given period of time; and a second responsive circuit for initiating a flash photographing operation in response to a second stroke of operation on the release button and also to the determination made by the determining circuit that the red-eye phenomenon preventing illumination has lasted for the given period of time.

28 Claims, 3 Drawing Sheets

CAMERA

BACKGROUND OF THE INVENTION

1. Field of the Invention

This invention relates to an improvement on a camera arranged to prevent a red-eye phenomenon which sometimes occurs in carrying out flash photography.

2. Description of the Related Art

The conventional device for preventing the red-eye phenomenon has been arranged to make a preliminary illumination for closing the pupil of a person before emitting a flash photographing light, as described, for example, in Japanese Patent Publication No. SHO 58-48088.

In accordance with the above-stated example of the conventional device, the human pupil is closed by the preliminary illumination. However, this arrangement has presented a problem in that the red-eye phenomenon preventing effect would be diminished if the photographing flash light is emitted before the lapse of time required for closing the pupil with the preliminary illumination.

SUMMARY OF THE INVENTION

Considering the problem of the prior art mentioned above, this invention is developed to provide a camera which solves the problem and is capable of reliably preventing the red-eye phenomenon without impairing the promptness of picture-taking operation thereof. To attain this object, the camera according to the invention is provided with first responsive means arranged to initiate a red-eye phenomenon preventing illumination in response to a first stroke of operation on a shutter release button; determining means for making a determination whether or not the red-eye phenomenon preventing illumination has lasted for a given period of time; and second responsive means arranged to initiate a flash photographing operation in response to a second stroke of operation on the shutter release button and also to the determination made by the determining means that the red-eye phenomenon preventing illumination has lasted for the given period of time. The camera is thus arranged to ensure that a flash photographing operation is allowed to begin only after the red-eye phenomenon preventing illumination has continued until the human pupil is sufficiently closed even when an instruction is received for the start of the flash photographing operation before the illumination has lasted for a period of time sufficiently long for closing the human pupil.

The above and other objects and features of the invention will become apparent from the following detailed description of an embodiment thereof taken in connection with the accompanying drawings

DETAILED DESCRIPTION OF THE PREFERRED EMBODIMENT

Figure 1:
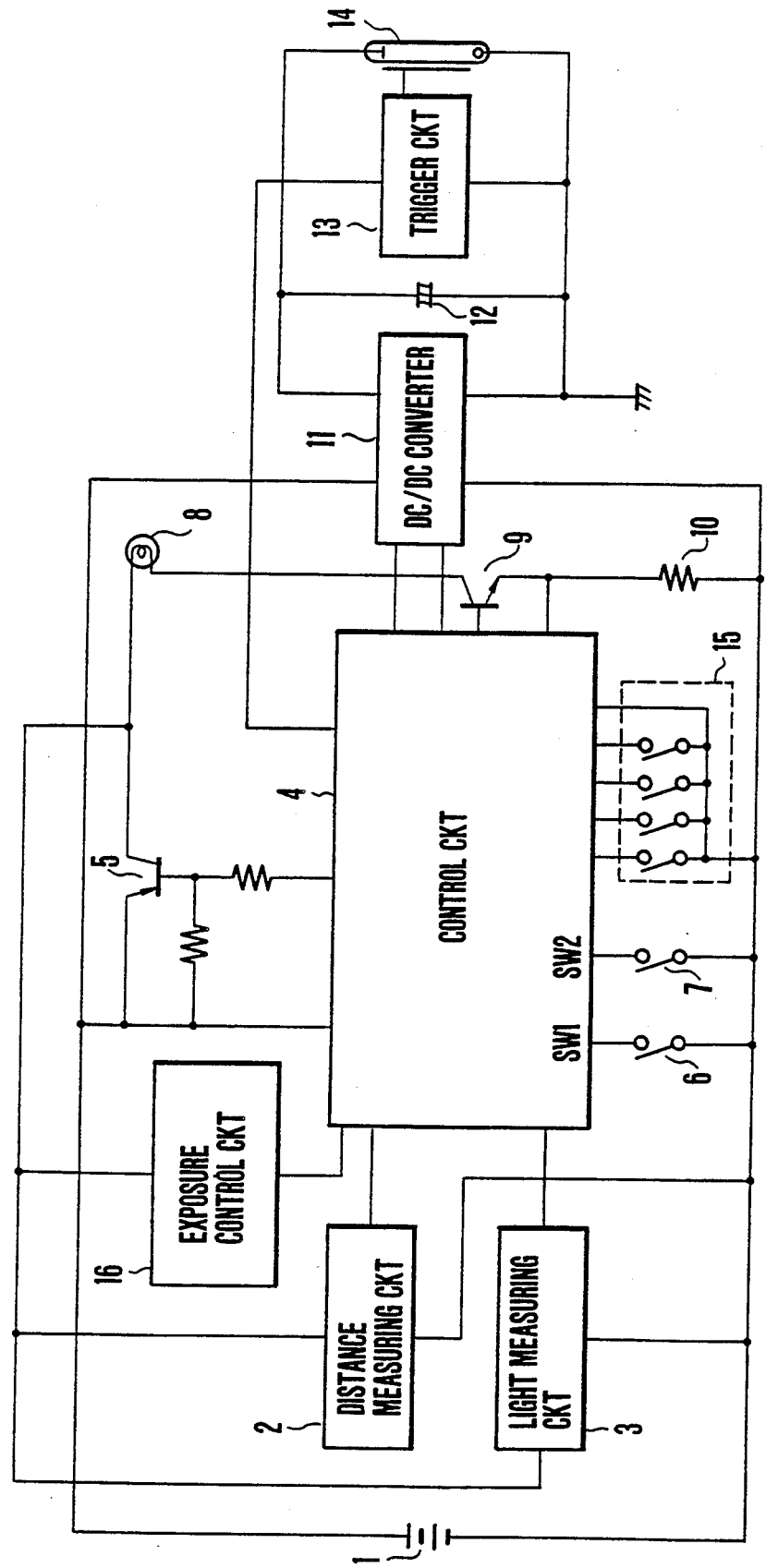
FIG. 1 is a block diagram showing the circuit arrangement of a camera which is arranged according to this invention as an embodiment thereof.
Figure 2:
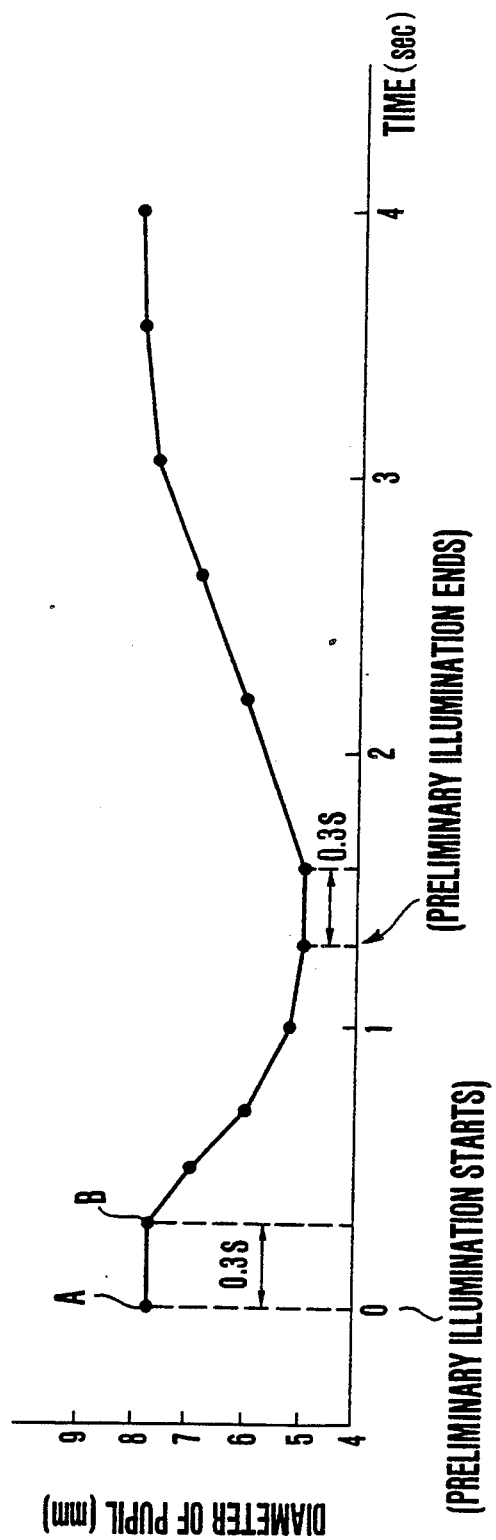
FIG. 2 is a graph showing the behavior of the human pupil under a preliminary illumination made by the same embodiment.
Figure 3:
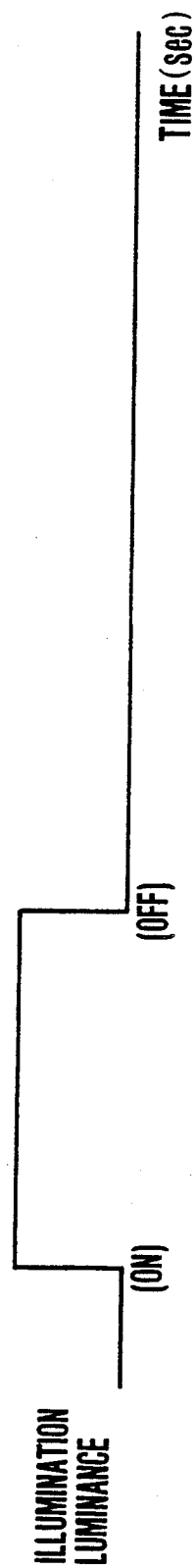
FIG. 3 shows the distribution of the luminance of light of the preliminary illumination.

The details of this invention are as described below through an embodiment thereof shown in the accompanying drawings:

FIG. 1 shows in a block diagram the circuit of a camera which is arranged as an embodiment of the invention. FIG. 2 shows in a graph the behavior of the human pupil under a preliminary illumination. The axis of abscissa of FIG. 2 shows time while the axis of ordinate shows the aperture of the pupil. FIG. 3 shows the luminance distribution of light of the preliminary illumination, the axis of abscissa of FIG. 3 showing time and the axis of ordinate the luminance of light of the illumination.

Referring to FIG. 1, the camera includes a battery 1 which is employed as a power source; a known distance measuring circuit 2; a known light measuring circuit 3; a control circuit 4 which is composed of a microcomputer, etc.; a transistor 5; a switch 6 which is arranged to be turned on by the first stroke of operation on a shutter release button; a switch 7 which is arranged to be turned on by the second stroke of operation on the shutter release button; a lamp 8 which is used for preliminary illumination for preventing the red-eye phenomenon; a transistor 9; a resistor 10; a known DC/DC (DC-to-DC) converter 11 which is provided for a flash device; a capacitor 12 for the flash device; a known trigger circuit 13; a xenon flash tube 14 which is arranged to generate light for flash photography; a film detection switch 15 which is provided for detection of the presence or absence of a film used as an image recording medium; and an exposure control circuit 16 which performs exposure control on the basis of information received from the light measuring circuit 3.

If the luminance of ambient light (luminance of field) is extremely low, the diameter of the human pupil is about 7.8 mm as shown at a point A of FIG. 2. When the eye is illuminated with a light under this condition as shown in FIG. 3, the pupil begins to become smaller after the lapse of about 0.3 sec as shown at a point B in FIG. 2. The pupil reaches its minimum size after the lapse of about 1.3 sec from the start of illumination and then ceases to move. When the illumination is brought to a stop at this moment, the pupil retains the minimum aperture for 0.3 sec after the stop of the illumination. The pupil then comes back to the original aperture after the lapse of 2.4 sec.

The camera according to this embodiment employs a method whereby a preliminary illumination is applied to the pupil prior to a flash photographing operation on the basis of the above-stated characteristic of the pupil.

Figure 4:
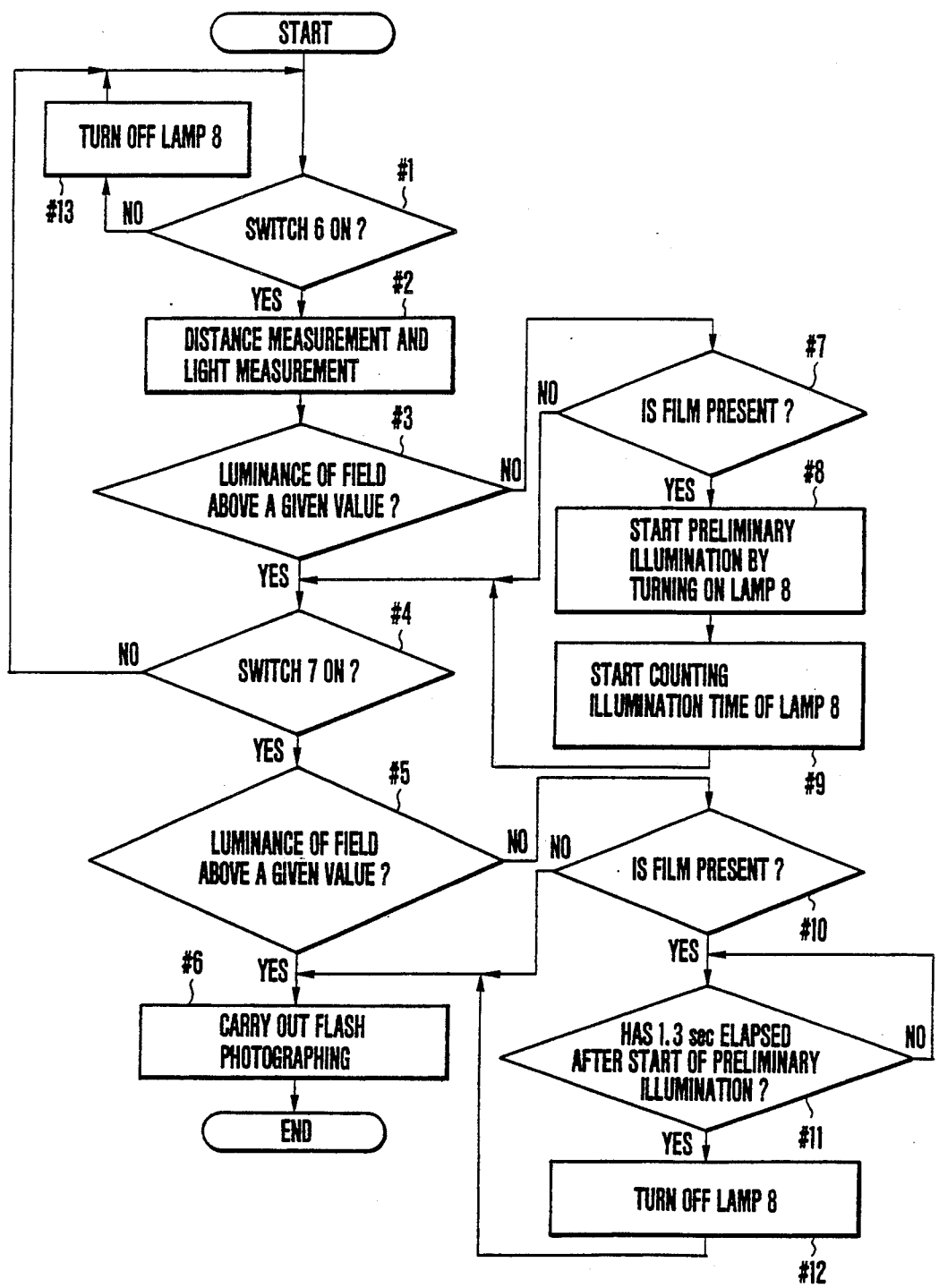
FIG. 4 is a flow chart showing the operation of the circuit shown in FIG. 1.

The following describes the operation of the circuit arrangement shown in FIG. 1 with reference to FIG. 4 which is a flow chart showing the operation of the control circuit of FIG. 1: The flow chart is limited, for the sake of simplification of illustration, to a case where a flash photographing mode is selected.

At a step #1: The switch 6 is turned on by the first stroke of the release button. At a step #2: The control circuit 4 lowers the base voltage of the transistor 5 to have the power supplied to each circuit. Then, the distance and light measuring circuits 2 and 3 are actuated to begin their distance and light measuring actions. At a step #3: A check is made to find if the luminance of the field measured by the light measuring circuit 3 is above a given value. If the luminance is found to be above the given value, it is not necessary to turn on the red-eye phenomenon preventing lamp 8 as the pupil of the person to be photographed is closed by the luminance of ambient light. In this case, therefore, the flow comes to a step #4. At the step #4: The switch 7 is checked to find if it has been turned on.

If the luminance of the field is found to be less than the given value, the flow comes to a step #7. At the step #7: The state of the switch 15 is checked to find whether the camera is loaded with a film. If the camera is found to be loaded with the film, the flow comes to a step #8. At the step #8: The voltage level of the base of the transistor 9 is caused to become high to turn on the red-eye phenomenon preventing lamp 8 for a preliminary illumination. At a step #9: At the same time, the illuminating time of the lamp 8 begins to be counted. Further, in a case where the camera is found to be not loaded with any film at the step #7, the level of the base of the transistor 9 is kept at a low level for saving the battery from being wasted, and then no preliminary illumination is effected. Such a case (the camera is found not loaded with any film at the step #7) results, for example, from a pushing action inadvertently performed on the shutter release button to its first stroke position.

After that, when the switch 7 is turned on with the second stroke of the release button caused by the photographer at the step #4, the flow of operation comes to a step #5. At the step #5: Again a check is made to find if the luminance of the field is above the given value. If so, a trigger signal is immediately sent to the trigger circuit 13 to cause the xenon flash tube 14 to flash, so that a flash photographing operation is performed by the exposure control circuit 16. Since the pupil diameter is minimized by the ambient luminance in this instance, flash photographing can be immediately carried out without causing the red-eye phenomenon.

If the luminance of the field is found to be less than the given value at the step #5, the flow comes to a step #10 to find if the camera is loaded with a film in the same manner as mentioned above. If the camera is found to be loaded with no film, a trigger signal is sent to the trigger circuit 13 to cause the xenon flash tube 14 to flash, so that a flash photographing operation is performed by the exposure control circuit 16. This situation (the case where the camera is found to be rot loaded with film) results, for example, from an inadvertent pushing action on the release button to the extent of its second stroke or from a test shooting made for confirmation of flashing.

If the camera is found to be loaded with a film at the step #10, the flow comes to a step #11. At the step #11: A check is made for the lapse of a period of time (about 1.3 sec) required before the pupil of a person as a photographing object reaches its minimum size after the preliminary illumination. If the required period of time is found to have elapsed, the flow comes to a step #12 to immediately lower the base level of the transistor 9 to turn off the red-eye phenomenon preventing lamp 8. If not, the base level of the transistor 9 is lowered after waiting for the lapse of the time required. After that, at the step #6, the trigger signal is sent to the trigger circuit 13 to cause the xenon flash tube 14 to flash, so that a flash photographing operation is performed by the exposure control circuit 16. Then, since the pupil is minimized by the above-stated preliminary illumination, the red-eye phenomenon is effectively prevented.

Further, in a case where the switch 7 is found to be in an off-state at the step #4, the flow comes back to the step #1 to find if the switch 6 is in an on-state. If the switch 6 is found to be also in an off-state, the flow comes to a step #13. At the step #13: Since the red-eye phenomenon preventing lamp 8 might be left in the state of being turned on at the step #8, the lamp 8 is turned off in that instance.

Further, it goes without saying that the above-stated preliminary illumination is made only for a flash photography mode and not for ordinary photographing.

In the case of this embodiment, the given value to be used at the steps #3 and #5 is set at such a value that corresponds to a luminance of field which is relatively low needing a flash light for shooting with an adequate exposure but is bright enough to close the pupil and thus to cause no red-eye phenomenon or a luminance of field at which a flash light is desirous for back-light correction.

In accordance with the arrangement of the embodiment described, the lamp 8 for the preliminary illumination is turned on by keeping the release button at its first stroke position. The length of time for which the lamp 8 is kept alight is selectable as desired by the photographer. However, the red-eye phenomenon preventing effect cannot be sufficiently attained if the lighting time of the lamp 8 is short. Therefore, the invention is arranged such that, if the release button is pushed down to its second stroke position within a short lighting period of the lamp 8, the flash photographing is allowed to begin after the lapse of a sufficiently long preliminary illumination time for closing the pupil. Therefore, even in that instance, the red-eye phenomenon can be effectively prevented.

Further, in performing a flash photographing operation with the pupil closed by a certain amount of the luminance of the field, the red-eye phenomenon never occurs and the preliminary illumination by turning on the lamp 8 is unnecessary. In that case, the embodiment does not make the preliminary illumination to save the battery from being wasted. This arrangement also prevents the shutter release time lag from being caused by the time required for illumination with the lamp 8.

In cases where the camera is not loaded with the film, the battery can be likewise prevented from being wasted. While the minimum time of the preliminary illumination is set at about 1.3 sec in the case of the embodiment, it can be set at any other suitable length of time as desired.

Further, in the case of the embodiment, the lamp to be used for preliminary illumination is discretely arranged apart from the xenon flash tube which is provided for flash photography. However, a single lamp may be arranged to perform the functions of both of them.

What is claimed is:

1. A camera comprising:
   a) first responsive means for initiating red-eye phenomenon preventing illumination in response to a first stroke of operation on a shutter release button;
   b) determining means for making a determination whether or not said red-eye phenomenon preventing illumination initiated by said first responsive means has lasted for a predetermined period of time; and
   c) second responsive means for initiating a flash photographing operation in response to a second stroke of operation on said shutter release button and also to the determination made by said determining means that said red-eye phenomenon preventing illumination has lasted for said predetermined period of time.

2. A camera according to claim 1, further comprising light emitting means for emitting an illumination light for said red-eye phenomenon preventing illumination.

3. A camera according to claim 1, further comprising light emitting means for emitting an illumination light for said flash photographing operation.

4. A camera according to claim 1, further comprising:
   d) first light emitting means for emitting an illumination light for said red-eye phenomenon preventing illumination; and
   e) second light emitting means for emitting an illumination light for said flash photographing operation.

5. A camera according to claim 1, wherein said first responsive means is included in a control circuit.

6. A camera according to claim 1, wherein said second responsive means is included in a control circuit.

7. A camera according to claim 1, wherein said first and second responsive means are included in a control circuit.

8. A camera according to claim 1, wherein said determining means includes means for operating in response to the second stroke of operation on said shutter release button.

9. A camera according to claim 1, wherein said first responsive means includes restricting means for rendering said first responsive means inoperative when the luminance of field is above a predetermined value.

10. A camera according to claim 1, wherein said second responsive means includes restricting means for rendering said second responsive means inoperative when the luminance of field is above a predetermined value.

11. A camera according to claim 1, wherein said first responsive means includes restricting means for rendering said first responsive means inoperative when the camera is not loaded with any image recording medium.

12. A camera according to claim 11, wherein said image recording medium includes a film.

13. A camera according to claim 1, wherein said second responsive means includes restricting means for rendering said second responsive means inoperative when the camera is not loaded with any image recording medium.

14. A camera according to claim 13, wherein said image recording medium includes a film.

15. A red-eye phenomenon preventing device of a camera, comprising:
   a) first responsive means for initiating red-eye phenomenon preventing illumination in response to a first stroke of operation on a shutter release button;
   b) determining means for making a determination whether or not said red-eye phenomenon preventing illumination initiated by said first responsive means has lasted for a predetermined period of time; and
   c) second responsive means for initiating a flash photographing operation in response to a second stroke of operation on said shutter release button and also to the determination made by said determining means that said red-eye phenomenon preventing illumination has lasted for said predetermined period of time.

16. A device according to claim 15, further comprising light emitting means for emitting an illumination light for said red-eye phenomenon preventing illumination.

17. A device according to claim 15, further comprising light emitting means for emitting an illumination light for said flash photographing operation.

18. A device according to claim 15, further comprising:
   d) first light emitting means for emitting an illumination light for said red-eye phenomenon preventing illumination; and
   e) second light emitting means for emitting an illumination light for said flash photographing operation.

19. A device according to claim 15, wherein said first responsive means is included in a control circuit.

20. A device according to claim 15, wherein said second responsive means is included in a control circuit.

21. A device according to claim 15, wherein said first and second responsive means are included in a control circuit.

22. A device according to claim 15, wherein said determining means includes means for operating in response to the second stroke of operation on said shutter release button.

23. A device according to claim 15, wherein said first responsive means includes restricting means for rendering said first responsive means inoperative when the luminance of field is above a predetermined value.

24. A device according to claim 15, wherein said second responsive means includes restricting means for rendering said second responsive. means inoperative when the luminance of field is above a predetermined value.

25. A device according to claim 15, wherein said first responsive means includes restricting means for rendering said first responsive means inoperative when the camera is not loaded with any image recording medium.

26. A device according to claim 25, wherein said image recording medium includes a film.

27. A device according to claim 15, wherein said second responsive means includes restricting means for rendering said second responsive means inoperative when the camera is not loaded with any image recording medium.

28. A device according to claim 27, wherein said image recording medium includes a film.

* * * * *